(12) United States Patent
Sato et al.

(10) Patent No.: US 6,331,822 B1
(45) Date of Patent: *Dec. 18, 2001

(54) COMMUNICATION CONTROL APPARATUS (75) Inventors: Morio Sato; Katsuhiro Ohuchi, both of Saitama (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,306

(22) Filed: Jul. 1, 1998

(30) Foreign Application Priority Data

| Jul. 1, 1997 | (JP) | ................................................ 9-176224 |
| Jun. 16, 1998 | (JP) | ............................................... 10-168452 |

(51) Int. Cl.$^7$ .................................................. G05B 23/02
(52) U.S. Cl. .............................. 340/825.07; 340/825.22; 370/282; 341/155; 375/220; 375/354; 700/9
(58) Field of Search ................ 340/825.06, 825.07, 340/825.08, 825.22; 370/223, 224, 294, 282; 341/141, 155; 375/259, 220, 354; 700/9, 21; 702/84

(56) References Cited

U.S. PATENT DOCUMENTS

| 5,146,401 | * | 9/1992 | Bansal et al. | ............................ 700/9 |
| 5,784,020 | * | 7/1998 | Inoue | ................................... 341/141 |
| 5,896,418 | * | 4/1999 | Hamano et al. | ...................... 375/259 |

FOREIGN PATENT DOCUMENTS 6276570A    9/1994   (JP) .

\* cited by examiner

Primary Examiner—Michael Horabik
Assistant Examiner—William Bangachon (57) ABSTRACT

A communication control apparatus for enabling an A/D converter to be shared among a plurality of input units to eliminate the work for newly installing an A/D converter for a new sensor when the sensor is added. A communication control apparatus is provided which includes input/output lines for connecting an input/output unit and a central control unit to each other and used for transmitting data, the central control unit is provided with an analog to digital converter and is used for carrying out processing of load control based on input data coming from the input/output lines, and the input/output unit. An input side of the input/output unit is connected to sensors and an external switch whereas an output side of the input/output unit is connected to a load such as a motor. The communication control apparatus wherein the input/output lines include transmission lines B1 and B2 for transmission of digital data and a transmission line A1 for transmission of analog data, and the input/output unit transmits specific data indicating a channel of analog data through the transmission line B1 when transmitting the analog data.

15 Claims, 5 Drawing Sheets

| | |
|---|---|
| START BIT (L LEVEL) | . . . 1 BIT |
| DATA ADDRESS BIT | . . . 1 BIT |
| FUNCTION ADDRESS BIT | . . . 1 BIT |
| DATA AREA | . . . 8 BITS |
| PARITY BIT | . . . 1 BIT |
| STOP BIT (H LEVEL) | . . . 1 BIT |
| ACKNOWLEDGE BIT | . . . 2 BITS |
| END BIT (H LEVEL) | . . . 1 BIT |

COMMUNICATION CONTROL APPARATUS

BACKGROUND OF THE INVENTION

1. Field of the Invention

The present invention relates to a communication control apparatus for transmitting analog and digital data.

2. Description of Background Art

As an example of a communication control apparatus, a control system employed in a vehicle for controlling a plurality of pieces of electrical equipment mounted on the vehicle is disclosed in Japanese Patent Laid-Open No. Hei6-276570. The disclosed vehicle control system comprises a plurality of input/output means and a central control means. The input/output means include: a sensor output reading means for fetching signals output by sensors installed on the electrical equipment; an input data generating means for generating input data from an output of the sensor output reading means; and 1st communication means each for converting an output of the input data generating means into a signal having a transmission format set in advance and outputting the signal to a data communication network as well as for extracting an energization signal for energizing the electrical equipment from a signal received from the data communication network.

On the other hand, the central control means comprises a 2nd communication means connected to the data communication network and a control means for controlling the electrical equipment through the 2nd communication means. Connected to the data communication network, the 2nd communication means is used for exchanging data with each of the 1st communication means.

By virtue of the vehicle control system described above, the number of microcomputers in use can be reduced, allowing the manufacturing cost of the electrical equipment employed in the vehicle to be cut as well.

In addition, the number of I/O ports provided on the central control means and the number of lines connecting the I/O ports on the central control means to the input/output means can also be reduced, allowing the central control means to have a compact construction. Furthermore, a change in input/output means specification entailing a replacement can be implemented by adding or removing lines connecting the I/O ports to the input/output means. As a result, the development efficiency can also be improved as well.

The disclosure described above also reveals an embodiment wherein an analog signal output by a steering wheel angle sensor is converted into digital data by means of an A/D converter for carrying out analog to digital conversion and the digital data is then transmitted to the central control unit.

In the conventional communication control apparatus, if the number of sensors each for outputting an analog signal is increased, it is necessary to provide as many additional A/D converters as sensors newly added. It is thus desirable to provide a communication control apparatus which allows a common A/D converter of a common A/D conversion unit to be shared among a plurality of sensors.

SUMMARY AND OBJECTS OF THE INVENTION

According to the present invention, a communication control apparatus is provided having input/output lines for connecting an input/output unit and a central control unit to each other; said central control unit used for carrying out processing of load control based on input data coming from said input/output lines and provided with an A/D conversion means; and said input/output unit wherein an input side of said input/output unit is connected to a plurality of sensors and an output side of said input/output unit is connected to loads such as actuators, said communication control apparatus wherein said input/output lines include a transmission line for transmission of digital data and a transmission line for transmission of analog data; said input/output unit is provided with a bus control means for transmitting specific data indicating a sensor type of analog data through said transmission line for transmission of digital data when transmitting said analog data; and said central control unit is provided with a control means for storing received analog data by associating said analog data with a sensor type of said analog data.

When an analog signal is transmitted through the transmission line for transmission of analog data, specific data indicating a sensor type of the analog signal is transmitted through the transmission line for transmission of digital data Thus, it is not necessary to physically distribute A/D converters among input units. As a result, it is necessary to merely convert an analog signal transmitted through the transmission line dedicated for transmission of analog data into digital data in the central control unit, allowing the communication control apparatus to be made compact and its cost to be reduced. In addition, when a new sensor generating an analog signal is added, the work to newly install an A/D converter for the sensor is not required anymore.

According to the present invention, said communication control apparatus is further characterized in that said input/output unit is provided with internal switches for switching pieces of analog data generated by the same plurality of sensors from a piece to another wherein an output side of said internal switches is connected to said transmission line for transmission of analog data; and said specific data indicating a sensor type of analog data is information identifying a channel of one of said internal switches.

By providing the input/output unit with a plurality of internal switches for switching pieces of analog data generated by the same plurality of sensors from a piece to another, the single transmission line for transmission of analog data is capable of transmitting the analog signals by passing on at a time only an output of one internal switch selected among the internal switches.

In addition, by transmitting specific data used for indicating a sensor type as information identifying a channel of one of the internal switches from the input/output unit to the central control unit through the transmission line for transmission of digital data, the central control unit is allowed to identify which of the sensors has generated the analog signal.

According to the present invention, said communication control apparatus is further characterized in that said transmission line for transmission digital data is a duplex transmission line for exchanging data as well as acknowledgments of reception of said data between said input/output unit and said central control unit.

As a result, it is possible to transmit data from the input/output unit to the central control unit and vice versa by using a single duplex transmission line, allowing the number of transmission lines between the input/output unit and the central control unit and, hence, the size as well as the cost of the communication control apparatus to be reduced.

According to the present invention, said communication control apparatus is further characterized in that said control means comprises: an A/D converter connected to said transmission line for transmission of analog data; a register for storing digital data resulting from conversion by said A/D converter; and a processing means for processing digital data read out from said register, wherein: said A/D converter is used for sequentially converting input analog signals coming from ports one signal after another into digital data; and upon activation of one of said internal switches in accordance with a request issued by said central control unit, said input/output unit transmits a signal for permitting said processing means to read out data from said register after a time it takes for a voltage of an input signal to sufficiently rise as an analog signal and a time it takes for said A/D converter to convert input analog signals from all said ports into digital data have lapsed.

As described above, upon activation of one of the internal switches in accordance with a request issued by the central control unit, the input/output unit transmits a signal for permitting the processing means to read out data from the register after a time it takes for a voltage of a signal generated by a sensor to sufficiently rise as an analog signal and a time it takes for the A/D converter to convert input signals from all said ports into digital data have lapsed. As a result, it is possible to read in an accurate value of an analog signal generated by each of the sensors connected to the input/output unit as digital data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The present invention will become more apparent from a careful study of the following detailed description of a preferred embodiment with reference to accompanying diagrams.

Figure 1:
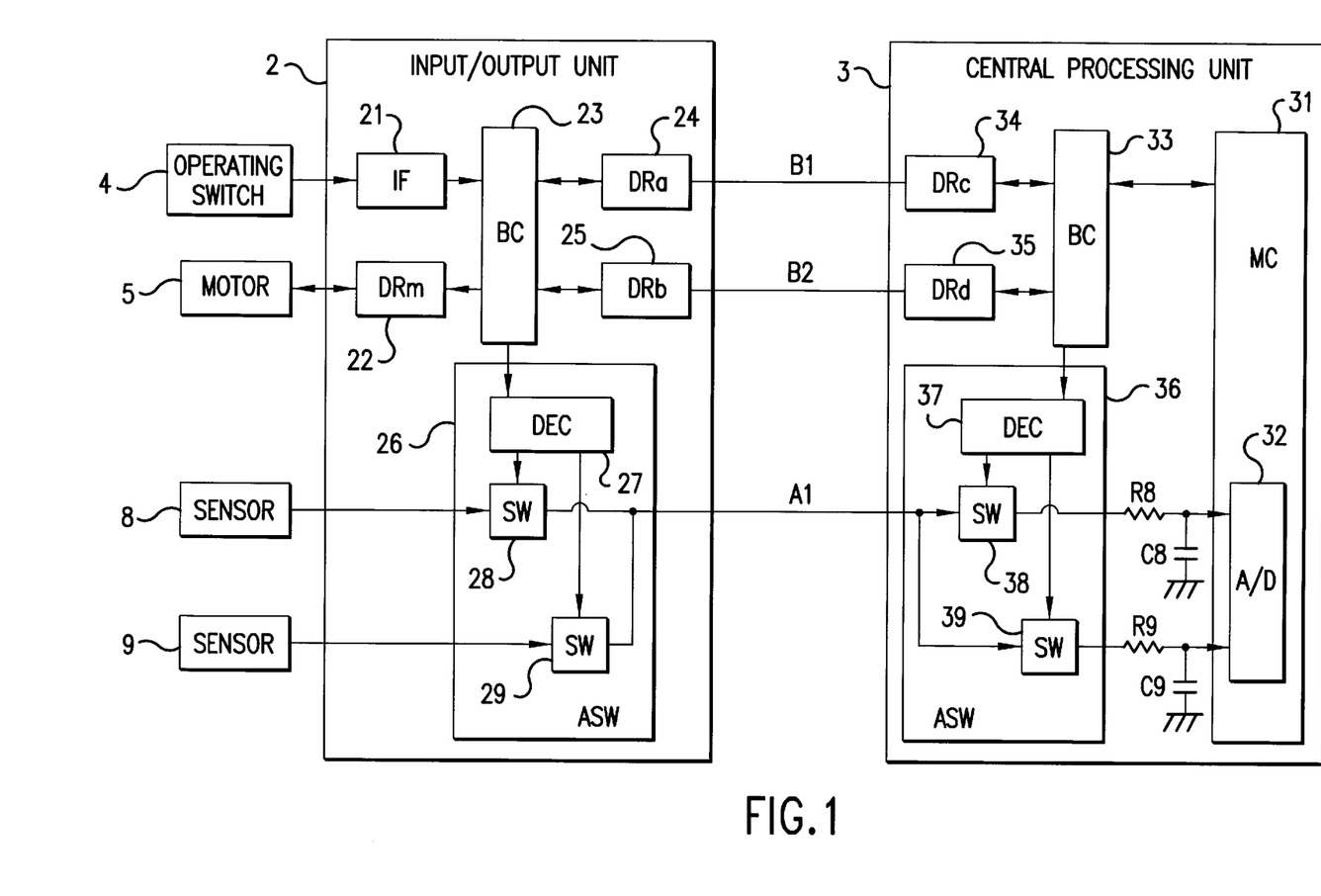
FIG. 1 is a simple block diagram showing the configuration of a communication control apparatus provided by the present invention.

FIG. 1 is a simple block diagram showing the configuration of a communication control apparatus provided by the present invention. As shown in FIG. 1, the communication control apparatus comprises an input/output unit 2, a central control unit 3, input/output lines A1, B1 and B2 connecting the input/output unit 2 to the central control unit 3. The input/output lines A1, B1 and B2 are used for transmitting data exchanged between the input/output unit 2 and the central control unit 3. The central control unit 3 carries processing to execute load control based on data received through the input/output lines A1, B1 and B2. An operation switch 4 as well as sensors 8 and 9 are connected to the input side of the input/output unit 2. On the other hand, loads such as an actuator are connected to the output side of the input/output unit 2.

The input/output lines B1 and B2 are each a transmission line for transmitting digital data while the input/output line A1 is a transmission line for transmitting an analog signal.

When an analog signal is transmitted, data indicating a channel of the analog signal is transmitted through the transmission line B1 used for digital data transmission.

A load can be a motor 5 as shown in FIG. 1, a solenoid coil of an electromagnetic valve or an indicator lamp.

The input/output line B1 is used for transmitting data from the input/output unit 2 to the central control unit 3 and for transmitting an acknowledgment of reception of the data by the central control unit 3 from the central control unit 3 to the input/output unit 2. By the same token, the input/output line B2 is used also for transmitting data from the central control unit 3 to the input/output unit 2 and for transmitting an acknowledgment of reception of the data by the input/output unit 2 from the input/output unit 2 to the central control unit 3.

Since the input/output lines B1 and B2 are provided, it is possible to avoid collision of data transmitted from the input/output unit 2 to the central control unit 3 with data transmitted from the central control unit 3 to the input/output unit 2. In addition, it is also possible to avoid collision of transmitted data and an acknowledgment of reception of the transmitted data. Furthermore, while the central control unit 3 is transmitting data through one of the input/output lines, say, the input/output line B1, the unit 3 is capable of receiving other data transmitted thereto through the other input/output line B2.

Next, the operation of the communication control apparatus is explained as follows.

Assume that the operation switch 4 of, for example, a cassette tape recorder is turned on. In this case, a state detection signal indicating the on state of the operation switch 4 is supplied to a bus controller 23 employed in the input/output unit 2 by way of an interface circuit 21 of the input/output unit 21. The bus controller 23 converts the state detection signal into a data frame determined in advance and supplies the data frame to the input/output line B1 by way of an input/output driver circuit 24.

In the central control unit 3, the data frame coming from the input/output line B1 is received by an input/output driver circuit 34 and then supplied to a bus controller 33. The bus controller 33 carries out a parity check on the incoming data frame. If no parity error is detected, the state detection signal is extracted back from the data frame and data for acknowledging the reception of the state reception signal is converted into a data frame determined in advance. This acknowledgment data frame is then output to the input/output line B1 by way of the input/output driver circuit 34.

In the input/output unit 2, the acknowledgment data frame coming from the input/output line B1 is received by the input/output driver circuit 24 and then supplied to the bus controller 23. The bus controller 23 finally extracts the data for acknowledging the reception from the acknowledgment data frame to verify the completion of the data transmission.

In the meantime, a microcomputer 31 employed in the central control unit 3 carries out processing to control an operation to drive the motor 5 based on the state detection signal supplied thereto by the bus controller 33, outputting a driving control signal to the bus controller 33.

The bus controller 33 converts the driving control signal into a data frame determined in advance and outputs the data frame to the input/output line B2 by way of the input/output driver circuit 35.

In the input/output unit 2, the data frame coming from the input/output line B2 is received by the input/output driver circuit 25 and then supplied to the bus controller 23. The bus controller 23 carries out a parity check on the incoming data frame. If no parity error is detected, the driving control signal is extracted back from the data frame and data for acknowledging the reception of the driving control signal is converted into an acknowledgment data frame determined in advance. This acknowledgment data frame is then output to the input/output line B2 by way of the input/output driver circuit 25.

In the central control unit 3, the acknowledgment data frame coming from the input/output line B2 is received by the input/output driver circuit 35 and then supplied to the bus controller 33. The bus controller 33 finally extracts the data for acknowledging the reception from the acknowledgment data frame to verify the completion of the data transmission.

The bus controller 23 employed in the input/output unit 2 then drives a driving circuit 22 which in turn drives a load such as the motor 5 in accordance with the driving control signal.

Assume that sensor 8 is a steering wheel angle sensor and the sensor 9 is a temperature sensor. The sensors 8 and 9 each generate an analog signal. The analog signals generated by the sensors 8 and 9 are supplied to switches 28 and 29 employed in an analog switch unit 26 in the input/output unit 2, respectively. In the communication control apparatus shown in FIG. 1, the analog switch unit 26 employs only the 2 switches 28 and 29 employed therein. It should be noted that the analog switch unit 26 can include 3 or more switches.

The following is a description of the operations to turn on the switch 28 and supply an analog signal generated by the sensor 8 connected to the switch 28 to the A/D converter 32 employed in the central control unit 3.

First of all, the bus controller 23 employed in the input/output unit 2 issues a command to the analog switch unit 26 to open the switches 28 and 29, putting the switches 28 and 29 in an open state. Then, the bus controller 23 outputs data indicating that the switch 28 has been closed and data indicating the type of the sensor 8 connected to the switch 28 to the input/output line B1, one of the transmission lines for transmission of digital data, by way of the input/output driver circuit 24.

The bus controller 33 employed in the central control unit 3 receives the data from the input/output line B1 through the input/output driver circuit 34 and, after putting the switches 38 and 39 in an open state, closes the switch 38 which serves as the counterpart of the switch 28.

After the switch 38 has been closed, the bus controller 33 outputs an acknowledgment of the reception of the data indicating that the switch 28 has been closed to the input/output line B2, the other transmission line for transmission of digital data, by way of the input/output driver circuit 35.

The bus controller 23 employed in the input/output unit 2 receives the acknowledgment of the reception of the data indicating that the switch 28 has been closed from the input/output line B2 through the input/output driver circuit 25 and puts the switch 28 in a closed state, terminating the operation to transmit the data which indicates that the switch 28 has been closed.

With the switch 28 put in a closed state, an analog signal generated by the sensor 8 is supplied to the A/D converter 32 by way of a path comprising the switch 28 employed in the input/output unit 2, the input/output line A1 for transmission analog data and the switch 38 employed in the central control unit 3.

The same operations are carried out when the switch 29 employed in the input/output unit 2 is closed.

It should be noted that the bus controller 23 employed in the input/output unit 2 alternately puts the switches 28 and 29 in a closed state at predetermined intervals. The digital data resulting from the A/D conversion which represents a steering wheel angle or a detected temperature is used as a base by the microcomputer 31 for carrying out processing to execute various kinds of control. The central control unit 3 then transmits data for load control to the input/output unit 2 by way of the input/output line B2.

When an analog signal is transmitted through the input/output line A1, data indicating the type of a sensor generating the analog signal is transmitted through the input/output line B1 for digital data transmission. Thus, it is not necessary to physically distribute A/D converters 32 among input units. As a result, it is necessary to merely convert an analog signal transmitted through the input/output line A1 dedicated for analog signal transmission into digital data in the central control unit 3 and to store the digital data in a memory of the microcomputer 31 which serves as a control means by associating the digital data with the type of the sensor, allowing the communication control apparatus to be made compact and its cost to be reduced. In addition, when a new sensor generating an analog signal is added, the work to newly install an A/D converter for the sensor is not required anymore.

Figure 2:
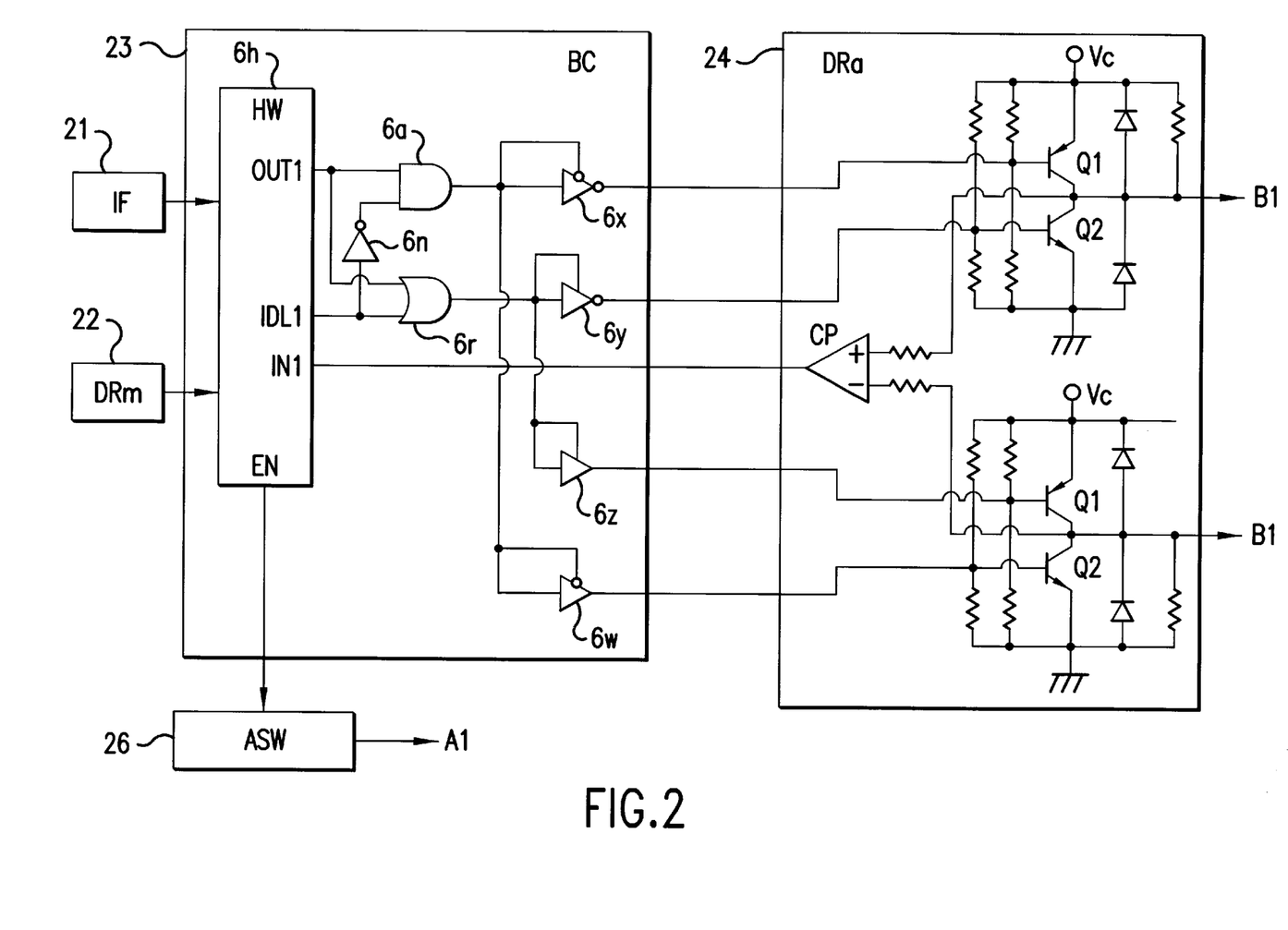
FIG. 2 is an explanatory diagram showing in more detail an input/output unit employed in the communication apparatus shown in FIG. 1.

FIG. 2 is an explanatory diagram showing the input/output unit 2 in more detail. It should be noted that FIG. 2 shows mainly the bus controller 23 and the input/output driver circuit 24. Designed into the same configuration as the input/output driver circuit 24, the input/output driver circuit 25 is not shown in FIG. 2.

As shown in FIG. 2, the bus controller 23 comprises a data frame conversion circuit 6h, an AND circuit 6a, an OR circuit 6r, a NOT circuit 6n and 4 3-state buffers 6x, 6y, 6z and 6w.

The 4 output signal lines of the 4 3-state buffers 6x, 6y, 6z and 6w are connected to the bases of 4 transistors Q1, Q2, Q3 and Q4 employed in the input/output driver circuit 24 respectively. The input/output driver circuit 24 is a totem-pole driving circuit wherein, when the transistors Q1 and Q4 are turned on, the transistors Q2 and Q3 are turned off. When the transistors Q1 and Q4 are turned off, on the other hand, the transistors Q2 and Q3 are turned on.

The input/output line B1 is actually implemented by a pair of wires. One of the wires is connected to a point of junction between the transistors Q1 and Q2 and to a+ input terminal of a comparator CP through a resistor. On the other hand, the other wire is connected to a point of junction between the transistors Q3 and Q4 and to a-input terminal of the comparator CP through a resistor. A signal output by the comparator CP is supplied to the data frame conversion circuit 6h employed in the bus controller 23.

The data frame conversion circuit 6h converts a signal coming from the interface circuit 21 such as a state detection signal into a data frame determined in advance and outputs the data frame by way of an OUT1 terminal. At that time, an ILD1 terminal of the data frame conversion circuit 6h is at an L level.

The data frame conversion circuit 6h receives a data frame from the comparator CP by way of an IN1 terminal, carrying out a parity check on the incoming data frame. Then, data for acknowledging the reception of the data frame is extracted from the data frame.

In addition, the data frame conversion circuit 6h supplies a select signal at predetermined intervals from an EN terminal thereof to the decoder 27 employed in the analog switch unit 26.

Figure 3:
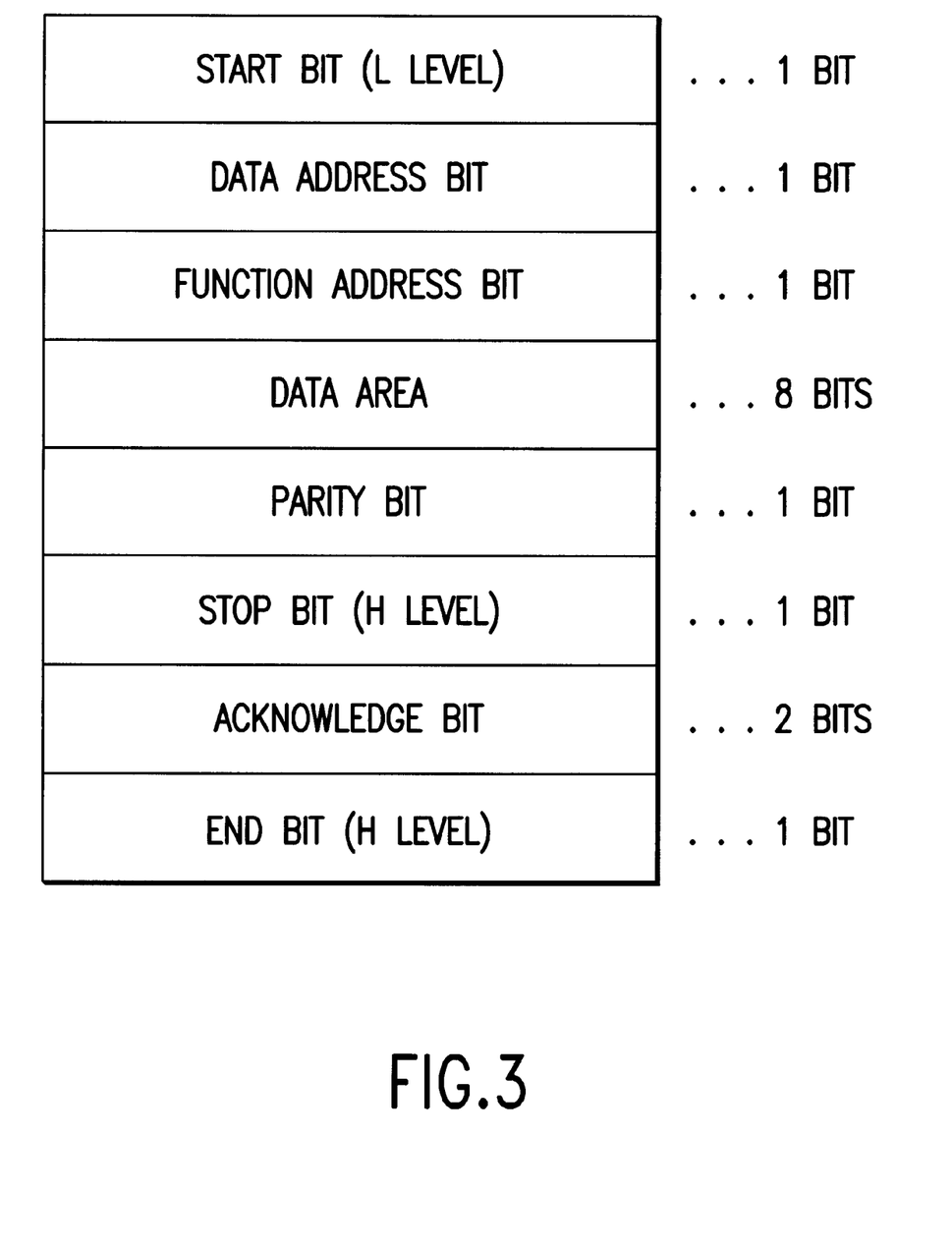
FIG. 3 is a diagram showing the format of a data frame.

FIG. 3 is an explanatory diagram showing the format of a data frame created in the bus controllers 23 and 33 and transmitted through the input/output lines B1 and B2. As shown in FIG. 3, the data frame is composed of 16 bits. A start bit at the head of the data frame is 1 bit in length and always set at an L level.

A data address bit following the start bit is also 1 bit in length. A data address bit set at an L level indicates a data frame to be supplied to a higher level port. On the other hand, a data address bit set at an H level indicates a data frame to be supplied to a lower level port.

A function address bit following the data address bit is also 1 bit in length. A function address bit set at an L level indicates a data frame associated with an analog signal. On the other hand, a function address bit set at an H level indicates a data frame for digital data. That is to say, when transmitting data indicating a channel of an analog signal, the function address bit is set at an L level. In cases other than transmission of data indicating a channel of an analog signal, the function address bit is set at an H level.

A data area following the function address bit is 8 bits in length. The data area is used for recording data representing a state detection signal or a driving control signal. In other words, data extracted from the data area represents a state detection signal or a driving control signal.

The bus controllers 23 and 33 receive data in parallel and supplies the data to a shift register to be converted into serial data. The serial data can then be stored in the data area.

A parity bit following the data area is 1 bit in length. The value of the parity bit represents parity of the rest of the data frame, from the data address bit to the data area.

A stop bit following the parity bit is also 1 bit in length. The stop bit is always set at an H level.

Acknowledge bits following the stop bit are 2 bits in length. The acknowledge bits are used for storing data for acknowledging reception. In other words, data extracted from the acknowledge bits represents an acknowledgment of reception of transmitted data. In actuality, however, only 1 of the acknowledge bits is used to indicate the validity of reception. To put it in detail, an L level of this bit indicates that a data frame has been received by the bus controller of the communication partner with no error or that the received data frame is valid. On the other hand, an H level of this bit indicates that a data frame has been received by the bus controller of the communication partner with an error detected or that the received data frame is invalid.

An end bit following the acknowledge bits is also 1 bit in length. Always set at an H level, the end bit is the last bit of the data frame.

It should be noted that the data frame conversion circuit 6h shown in FIG. 2 can also be built from logic circuits (hardware).

The bus controller 23 also includes an OUT2 terminal, an IDL2 terminal and an IN2 terminal which have similar functions as the OUT1 terminal, the IDL1 terminal and the IN1 terminal described above, respectively. In addition, the bus controller 23 also includes an AND circuit 7a, an OR circuit 7r, a NOT circuit 7n and 4–3 state buffers 7x, 7y, 7z and 7w which have the same functions as the AND circuit 6a, the OR circuit 6r, the NOT circuit 6n and the 4 3-state buffers 6x, 6y, 6z and 6w described above, respectively. The IN2 terminal and the outputs of the 3-state buffers 7x, 7y, 7z and 7w are connected to the input/output driver circuit 25 which has the same configuration as the input/output driver circuit 24, the IN1 terminal and the outputs of the 3-state buffers 6x, 6y, 6z and 6w are connected to the input/output driver circuit 24.

The bus controller 33 employed in the central control unit 3 can be designed into the same configuration as the bus controller 23 of the input/output unit shown in FIG. 2.

Figure 4:
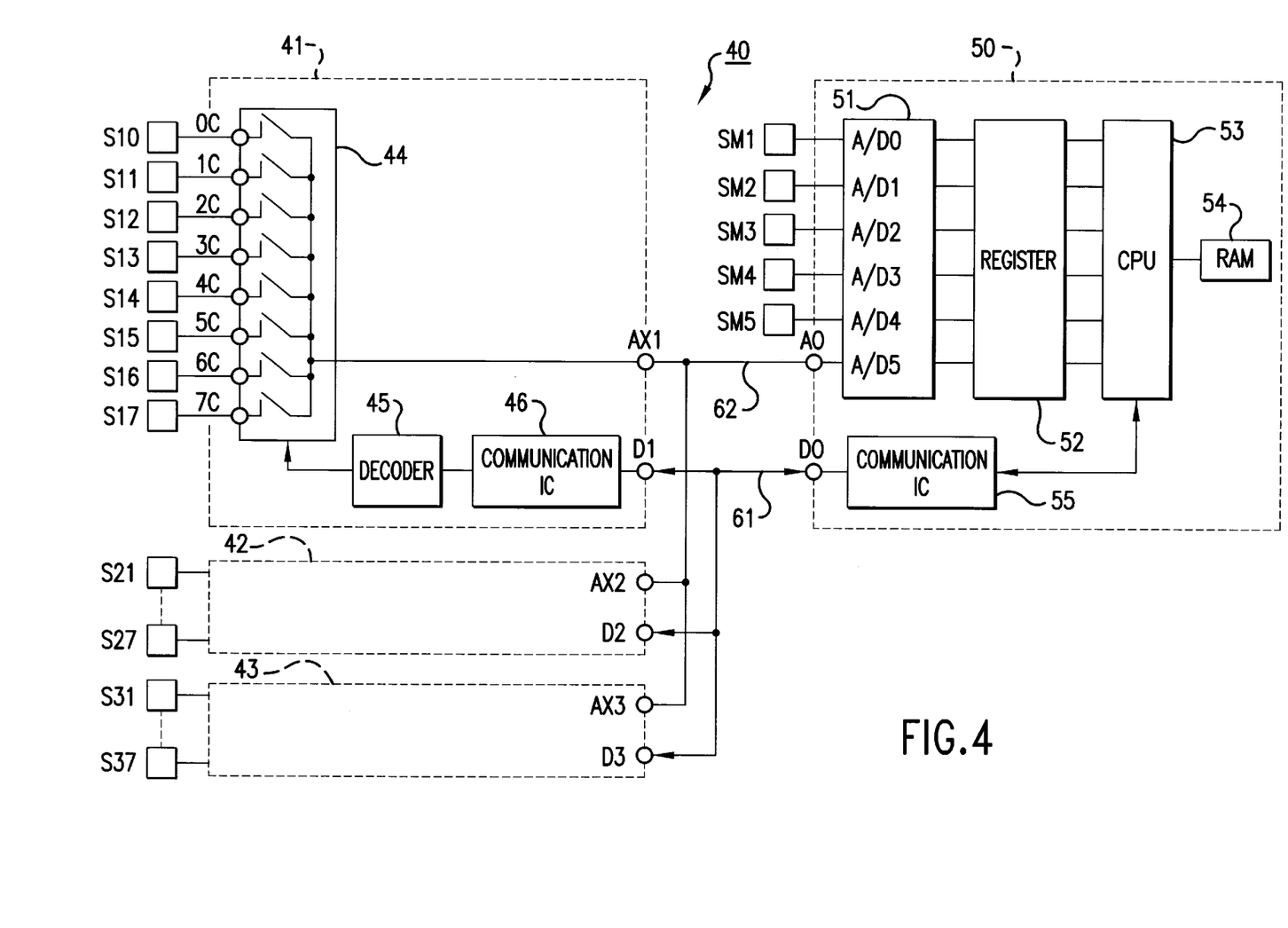
FIG. 4 is a block diagram showing major components illustrating another embodiment implementing the communication control apparatus provided by the present invention.

FIG. 4 is a block diagram showing major components composing another embodiment implementing the communication control apparatus provided by the present invention.

As shown in FIG. 4, the communication control apparatus 40 comprises 3 input/output units 41, 42 and 43, a central control unit 50 and a single digital bus 61 used as a duplex transmission line for transmission of digital data in both directions as well as a single analog bus 62 used as a transmission line for transmission of analog data.

It should be noted that the input/output units 41, 42 and 43 are connected to the digital bus 61 through terminals D1, D2 and D3 respectively. By the same token, the input/output units 41, 42 and 43 are connected to the analog bus 62 through terminals AX1, AX2 and AX3, respectively.

The input/output units 41, 42 and 43 each comprise an analog switch unit 44, a decoder 45 and a communication IC 46. Composed of switches for 8 channels, the analog switch unit 44 closes one of the switches of the 8 channels identified by a code supplied thereto by the decoder 45.

On the other hand, input terminals 0C to 7C of the analog switch 44 employed in the input/output unit 41 are connected to a variety of sensors S10 to S17 respectively. An analog signal generated by one of the sensors connected to a closed switch of the analog switch unit 44 is transmitted to the central control unit 50 by way of the terminal AX1, the analog bus 62 and a terminal A0 on the central control unit 50.

It should be noted the sensors S10 to S17 are each a sensor which exhibits a gradual change in output with the lapse of time. Examples of the sensors S10 to S17 are a water temperature sensor, an atmospheric pressure sensor and an intake air temperature sensor.

The communication IC 46 receives a code identifying a channel transmitted by the central control unit 50 by way of a terminal D0 on the central control unit 50, the digital bus 61 and the terminal D1, supplying the code to the decoder 45. The communication IC 46 also outputs data indicating that a sensor signal is ready to be read into the digital bus 61.

It should be noted that the input/output units 42 and 43 are the same as the input/output units 41 except that the input terminals 0C to 7C of the analog switch unit 44 are connected to different sensors S20 to S27 in the case of the input/output terminal unit 42 and to still different sensors S30 to S37 in the case of the input/output terminal unit 43.

The central control unit 50 comprises an A/D converter 51 connected to the analog bus 62 for transmission of analog data, a register unit 52 for storing digital data resulting from analog-to-digital conversion by the A/D converter 51, a CPU 53 for processing digital data read in from the register unit 52, a RAM unit 54 and a communication IC 55.

The A/D converter 51 has typically 6 input ports A/D0 to A/D5 each provided for a channel. The input ports A/D0 to A/D4 are connected to sensors SM1 to SM5, respectively. The sensors SM1 to SM5 are each a sensor exhibiting a fast change with the lapse of time or a sensor used in high speed processing such as ignition and FI (fuel injection). It is the input port A/D5 that connects the A/D converter 51 to the analog bus 62 by way of the terminal A0.

Examples of the sensors SM1 to SM5 are a potentiometer of ABS data, a throttle sensor and a knocking sensor which are used in high speed processing. Analog signals generated by the sensors SM1 to SM5 are supplied to the A/D converter 51.

The A/D converter 51 converts analog signals supplied to the input ports A/D0 to A/D5 into digital data one signal after another by sequentially scanning the input ports A/D0 to A/D5 and stores the digital data in the register unit 52.

The register unit 52 comprises registers R1 to R6 for temporarily storing the digital data resulting from the analog-to digital conversion of the analog signals supplied to the input ports A/D0 to A/D5. The digital data stored in the register unit 52 is supplied to the CPU 53 to be stored in the RAM unit 54 or to be processed by the CPU 53. The CPU 53 executes control of the whole operation of the communication control apparatus 40 based on a program provided in advance.

The communication IC 55 transmits a code identifying a channel of the switch unit 44 to each of the input/output units 41, 42 or 43 through the digital bus 61 and receives data indicating that a sensor signal is ready to be input from the input/output units 41, 42 and 43. The data indicating that a sensor signal can be input from the input/output units 41, 42 and 43 is passed on to the CPU 53 which then reads in digital data of the sensor signal stored temporarily in the register unit 52 and processes the digital data or stores the digital data in the RAM unit 54.

Figure 5:
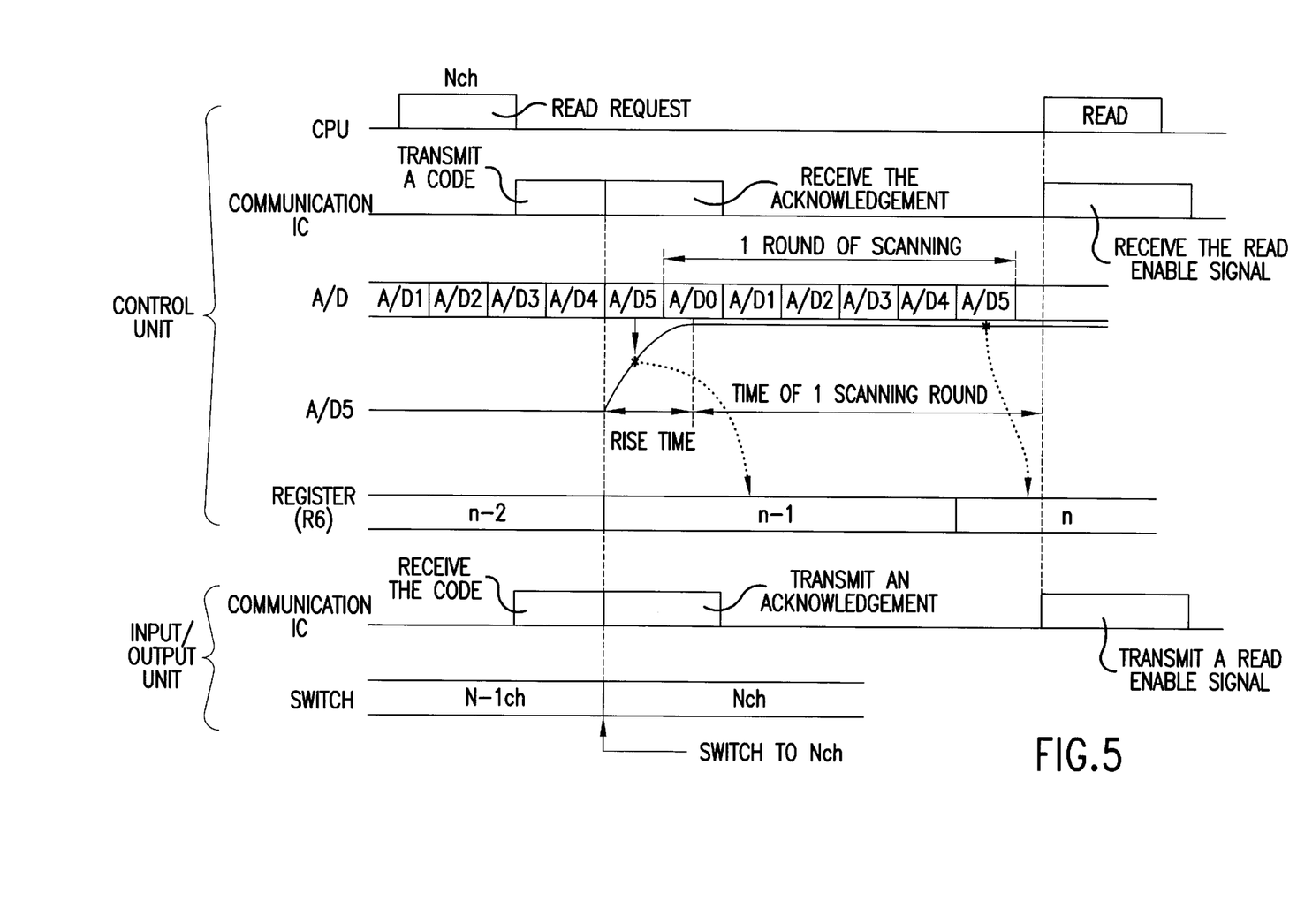
FIG. 5 shows timing charts of operations carried out by the communication control apparatus provided by the present invention shown in FIG. 4.

Next, communication between the central control unit 50 and the input/output units 41 to 42 is explained by referring to FIG. 5 which shows timing charts of operations carried out by the communication control apparatus 40 provided by the present invention. To be more specific, the timing charts shown in FIG. 5 represent an operation carried out by the CPU 53 to select one of the switches in the analog switch unit 44, analog-to-digital conversion to convert an analog signal generated by a sensor connected to the selected switch into digital data and an operation to store the digital data into the register unit 52.

Assume that, in the example shown in FIG. 5, the CPU 53 employed in the central control unit 50 outputs digital data as a command requesting data input from the sensor S13 connected to the input/output unit 41. In this case, the communication IC 55 converts the data requesting command into a code identifing one of the switches in the analog switch unit 44 that is connected to the sensor S13 and transmits the digital data representing the code to the input/output unit 41 through the digital bus 61.

The communication IC 46 employed in the input/output 41 receives the code from the digital bus 61, actuating the analog switch unit 44 to select one of the switches thereof for channel #3 of the sensor S13 through the decoder 45. It should be noted that channel #3 is denoted by notation Nch in FIG. 5.

Since the switch for channel #3 is connected to the sensor S13, at the time the analog switch unit 44 selects the switch, an analog signal generated by the sensor S13 is supplied right away to the input port A/D5 of the A/D converter 51 through the analog bus 62.

The communication IC 46 then transmits data indicating that an analog signal generated by the sensor S13 can be input to the communication IC 55 after a time it takes for the voltage of the sensor signal to sufficiently rise as an analog signal and a time it takes for the A/D converter 51 to convert input signals from all the input ports A/D0 to A/D5 into digital data after 1 round of scanning has lapsed.

The communication IC 55 passes on the data indicating that an analog signal generated by the sensor S13 can be input to the CPU 53. Receiving the data, the CPU 53 lets the A/D converter 51 convert the analog signal supplied to the input port A/D5 by the sensor S13 into digital data and lets the register unit 52 store the digital data in the register R6 thereof.

As a result, since a time it takes for the voltage of the sensor signal to sufficiently rise as an analog signal and a time it takes for the A/D converter 51 to convert the analog signal into digital data has at least once lapsed since the selection of the channel before the CPU 53 reads out the result of the conversion, the analog signal can be detected with a high degree of accuracy.

As described above, in the communication control apparatus provided by the present invention, since an input/output unit transmits data indicating that an analog signal generated by a sensor can be read out from the register unit to the central control unit after a time it takes for the voltage of the sensor signal to sufficiently rise as an analog signal and a time it takes for the A/D converter to convert input signals from all the input ports into digital data has lapsed, an accurate value of an analog signal generated by any sensor connected to any of the input/output units can be read in as a digital signal.

The communication control apparatus provided by the present invention can be mounted on a vehicle and used as a communication control apparatus for the vehicle. In this case, as a power supply voltage Vc applied to the communication control apparatus, the voltage of the battery of the vehicle can be used.

In addition, the embodiments described are no more than examples of an implementation of the present invention which are therefore not intended to be construed in a limiting sense. That is to say, it is needless to say that the scope of the present invention is not limited to the embodiments.

According to the present invention, when an analog signal is transmitted from the input/output unit to the central control unit through an input/output line dedicated for analog signal transmission, data indicating a channel of the analog signal is also transmitted from the input/output unit to the central control unit through another input/output line dedicated for digital data transmission. Thus, it is not necessary to physically distribute A/D converters among input units. As a result, it is necessary to merely convert an analog signal transmitted through the input/output line dedicated for analog signal transmission into digital data in the central control unit, allowing the communication control apparatus to be made compact and its cost to be reduced. In addition, when a new sensor generating an analog signal is added, the work to newly install an A/D converter for the sensor is not required anymore.

In addition, according to the present invention, it is possible to avoid collision of data transmitted from the input/output unit to the central control unit with data transmitted from the central control unit to the input/output unit.

In addition, it is also possible to avoid collision of transmitted data and an acknowledgment of reception of the transmitted data. Furthermore, while the central control unit is transmitting data through one of the input/output lines, the central control unit is capable of receiving other data transmitted thereto through another one of the input/output lines.

Moreover, according to the present invention, a signal for allowing a processing means employed in a central control unit to read in data from a register is not transmitted to the central control unit until a time it takes for the voltage of a sensor signal to sufficiently rise as an analog signal and a time it takes for an A/D converter employed in the central control unit to convert input signals from all input ports thereof into digital data lapse, an accurate value of an analog signal generated by any sensor connected an input/output unit can be read in as a digital signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication control apparatus comprising:
  a central processing unit for processing load control based on inputted data;
  an input/output unit for generating signals wherein an input side of said input/output unit is connected to a plurality of sensors and an output side of said input/output unit is connected to at least one load;
  input/output lines for connecting said input/output unit and said central processing unit to each other for inputting data thereto, said input/output lines include at least one digital data transmission line and an analog data transmission line;
  an A/D conversion means operatively employed in said central processing unit for converting analog signals from said input/output unit to digital signals;
  a bus controller employed in the input/output unit and a bus controller employed in the central processing unit operatively connected to each other by said at least one digital data transmission line, said bus controllers transmitting specific data indicating a sensor type of analog data through said at least one digital data transmission line when transmitting said analog data; and
  a control means operatively connected to said central processing unit for storing received analog data by associating said analog data with a sensor type of said analog data, wherein said control means includes said A/D conversion means connected to said analog data transmission line; a register for storing digital data resulting from conversion by said A/D conversion means; and a processing means for processing digital data read out from said register, wherein said A/D conversion means is used for sequentially converting input analog signals coming from a plurality of ports one signal after another into digital data; and upon activation of one of said internal switches in accordance with a request issued by said central processing unit, said input/output unit transmits a signal for permitting said processing means to read out data from said register after a time it takes for a voltage of an input signal to sufficiently rise as an analog signal and a time it takes for said A/D conversion means to convert input analog signals from each of said ports into digital data have lapsed.

2. The communication control apparatus according to claim 1, wherein said input/output unit is provided with internal switches for switching bits of analog data generated by the same plurality of sensors from bits to another wherein an output side of said internal switches is connected to said transmission line for transmission of analog data; and said specific data indicating a sensor type of analog data is information identifying a channel of one of said internal switches.

3. The communication control apparatus according to claim 1, wherein said at least one transmission line for transmission of digital data is a duplex transmission line for exchanging data as well as acknowledgments of reception of said data between said input/output unit and said central control unit.

4. The communication control apparatus according to claim 2, wherein said at least one transmission line for transmission of digital data is a duplex transmission line for exchanging data as well as acknowledgments of reception of said data between said input/output unit and said central control unit.

5. The communication control apparatus according to claim 1, wherein said at least one digital data transmission line is two transmission lines.

6. The communication control apparatus according to claim 1, wherein said at least one load connected to the output side of said input/output unit is an actuator.

7. The communication control apparatus according to claim 1, wherein said at least one load connected to the output side of said input/output unit is a load from a motor.

8. A communication control apparatus comprising:
  a central processing unit processing load control based on inputted data;
  an input/output unit generating signals wherein an input side of said input/output unit is connected to a plurality of sensors and an output side of said input/output unit is connected to at least one load;
  input/output lines for connecting said input/output unit and said central processing unit to each other for inputting data thereto, said input/output lines include at least one digital data transmission line and an analog data transmission line;
  an A/D converter operatively connected to said central processing unit to convert analog signals from said input/output unit to digital signals;
  a bus controller operatively connected to said input/output unit to transmit specific data indicating a sensor type of analog data through said at least one digital data transmission line when transmitting said analog data; and
  a controller operatively connected to said central processing unit for storing received analog data by associating said analog data with a sensor type of said analog data.

9. The communication control apparatus according to claim 8, wherein said input/output unit is provided with internal switches for switching bits of analog data generated by the same plurality of sensors from bits to another wherein an output side of said internal switches is connected to said transmission line for transmission of analog data; and said specific data indicating a sensor type of analog data is information identifying a channel of one of said internal switches.

10. The communication control apparatus according to claim 8, wherein said at least one transmission line for transmission of digital data is a duplex transmission line for exchanging data as well as acknowledgments of reception of said data between said input/output unit and said central control unit.

11. The communication control apparatus according to claim 9, wherein said at least one transmission line for transmission of digital data is a duplex transmission line for exchanging data as well as acknowledgments of reception of said data between said input/output unit and said central control unit.

12. The communication control apparatus according to claim 9, wherein said controller comprises: said A/D conversion means being connected to said transmission line for transmission of analog data; a register for storing digital data resulting from conversion by said A/D conversion means; and a processor for processing digital data read out from said register, wherein said A/D conversion means is used for sequentially converting input analog signals coming from a plurality of ports one signal after another into digital data; and upon activation of one of said internal switches in accordance with a request issued by said central control unit, said input/output unit transmits a signal for permitting said processor to read out data from said register after a time it takes for a voltage of an input signal to sufficiently rise as an analog signal and a time it takes for said A/D conversion means to convert input analog signals from all said ports into digital data have lapsed.

13. The communication control apparatus according to claim 8, wherein said at least one load connected to the output side of said input/output unit is an actuator.

14. The communication control apparatus according to claim 8, wherein said at least one load connected to the output side of said input/output unit is a load from a motor.

15. The communication control apparatus according to claim 8, wherein said at least one digital data transmission line is two transmission lines.

* * * * *